Nov. 9, 1965

GORO SATO 3,216,090

PROCESS OF PRODUCING SOLID COMPOSITION RESISTORS OF MONOLITHIC STRUCTURE

Filed Nov. 6, 1961

3,216,090
Patented Nov. 9, 1965

3,216,090

PROCESS OF PRODUCING SOLID COMPOSITION RESISTORS OF MONOLITHIC STRUCTURE

Goro Sato, Amagasaki, Japan, assignor to Mitsubishi Denki Kabushiki Kaisha, Tokyo, Japan, a corporation of Japan Filed Nov. 6, 1961, Ser. No. 150,549
5 Claims. (Cl. 29—155.7)

This invention relates to a process of producing solid composition resistors of monolithic structure.

Solid composition resistors presently used in radio and television equipments comprise generally resistance elements encapsulated with thermoset resins. To this end molding operation is required to be separately performed. Further, thermal expansion and contraction of the solid composition resistor during operation may form clearances between its leads and the adjacent portions of the protective capsule permitting ingress of a vapor of water or other gases or vapors therethrough which will be deleteriously reacted on the material of the resistance element resulting in variation in its resistance.

A principal object of the invention is to provide a novel and improved method by which solid composition resistors of monolithic structure having consistently predetermined values of resistance can be mass-produced with a maximum production yield.

A general object of the invention is to avoid and overcome the foregoing difficulty and other difficulties of and objections to the prior art practice by providing durable and inexpensive solid composition resistors of monolithic structure capable of meeting extremely severe requirements during operation.

A more special object of the invention is to provide a novel and improved process of producing mechanically and thermally stable solid composition resistors without the necessity of applying separately protection to the same.

Another object of the invention is to provide a novel and improved process of producing durable solid composition resistors of monolithic structure in very simple manner without limitation as to the final physical forms and dimensions thereof.

A further object is to provide a novel and improved process of producing solid composition resistors of monolithic structure having electrical characteristics not substantially affected by moisture and remaining permanently substantially unchanged in magnitude of resistance.

In accordance with the present invention and in attainment of the foregoing objects there is provided a process of producing a solid composition resistor, comprising the steps of preparing a porous base body formed of a partially sintered refractory material or materials and having a predetermined physical form, impregnating into substantially the entire of the porous base body an impregnant which is converted into an electrically conducting material upon reduction firing, drying the impregnated base body, reduction firing the dried base body with the impregnant in an atmosphere which does not deleteriously affect the impregnant, to thereby convert the impregnant into the electrically conducting material within the base body, and removing the portion of the electrically conducting material precipitate on and adjacent the surface of the base body from the same so as to impart a predetermined magnitude of resistance to the composition resistor, whereby an electrically insulating layer including the material of the base body is formed on and adjacent said surface of the body.

The insulating surface layer may be preferably densificated by sintering operation in a vacuum atmosphere or in an inert atmosphere.

The invention will become more readily apparent from the following detailed description taken in conjunction with the accompanying drawings in which.

Figure 1A:
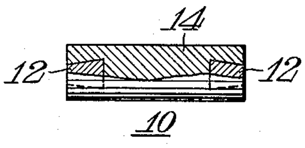
FIG. 1 shows partly in section and partly in elevation a solid composition resistor of circular rod shape being processed in different steps according to the teachings of the invention.

In practicing the invention a matrix or base body for a solid composition resistor is first prepared by injection molding or compression shaping a mass of finely divided refractory material or materials in a predetermined physical form and partially sintering the molded or shaped body to form an electrically insulating porous ceramic member. Examples of the refractory material suitable for use in the invention involve feldspar, porcelain clay, alumina ($Al_2O_3$), silicic acid anhydride ($SiO_2$), magnesia ($MgO$), zirconium dioxide ($ZrO_2$), oxides of alkaline earth metals such as barium oxide ($BaO$) and calcium oxide ($CaO$), mixtures of the foregoing, and the like. It has been found that, among them the oxides of alkaline earth metals can be used to give satisfactory results. The molded or shaped base body may be of solid or hollow circular rod having either a circularly cylindrical configuration or a screw threaded protrusion on the peripheral surface, or circular plate, or substantially U-shaped flat plate or any other suitable physical form.

As an example, a preferred composition of a matrix or base material may comprise either (1) 55.6% $SiO_2$, 12.4% $Al_2O_3$, 21.4% $MgO$, 9.5% $BaO$, 0.4% $CaO$, 0.2% Fe and small amounts of others or (2) 57.6% $SiO_2$, 15.7% $Al_2O_3$, 23.8% $ZrO_2$, 1.3% $BaO$, 0.9% $CaO$, 0.2% $ZnO_2$ and small amounts of others with the proportions represented by percents by weight of the mixture.

The aforesaid compounds may be ground and added with a suitable amount of water to form a mixture which, in turn is fired at a temperature of from 1260° to 1300°. The fired body is finely divided into average particle diameter of from one to two microns. The mass of base material thus prepared may be subjected to either compression shaping or injection molding with the addition of water and any suitable water-soluble organic binder which may be gelatin, polyvinyl alcohol or the like. Preferably, a rod-like base body will be made by injection molding under a pressure of from 10 to 15 kg./cm.$^2$ while a flat plate-like base body made by compression shaping under a pressure of about 0.5 ton/cm.$^2$. Then the shaped or molded body as dried is partially sintered at a temperature of from 1200° to 1260° C. to form an electrically insulating porous ceramic base body having a porosity ranging from 5 to 25%. It is preferable that a base body having a low porosity is used when the finished solid composition resistor is desired to have a high resistance whereas one having a high porosity is used when a composition resistor is required to have a low resistance.

The base body thus prepared is cut into lengths determined by the final value of resistance to be obtained and the cut base bodies are then provided at both ends with recesses respectively into which masses of graphite or a metallic powder are inserted and tapped respectively.

In order to carry an electrical resistance-yielding or electrically conducting material within the cut base body, a solution of such material is impregnated into the same according to the teachings of the invention.

If carbon is used as an electrically conducting material in the finished solid composition resistor, a solution of high molecular organic material such as a phenol resin, cresol formaldehyde resins or aniline formaldehyde resins can be sufficiently and uniformly impregnated into the base body under vacuum and then dried. To effect uniform impregnation the base body may preferably be slowly rotated about its longitudinal axis within a resin bath. It will be understood that, with a thermosetting resin used, it should be heated to be cured. It has been found that the use of high molecular weight organic materials such as phenol resins capable of being cured in three-dimensional form by condensation reaction gives satisfactory result although it would be not necessary to use them.

If a metal is utilized as an electrically conducting material in the finished resistor a solution of nitrate of a metal such as nickel, molybdenum, titanium or the like can be sufficiently and uniformly impregnated into the base body under vacuum. In this case, it is possible to use a nitrate of any of metals other than alkali metals, aluminum and magnesium and also to use a mixture of nitrates of two or more metals just described.

Also it is possible to advantageously employ any impregnant comprising an alcoholic solution of a phenol resin containing a nitrate of any metal as above described in such a proportion that the corresponding element metal is present in the impregnant in an amount of from $M/100$ g. to $M/10$ g. per 1000 g. of the resin with M representing the atomic weight of the element metal. It has been found that the use of thorium exhibited excellent resistance characteristics. As an example, the composition of the impregnant may comprise 100 parts by weight of a phenol resin, 18 parts by weight of thorium nitrate ($Th(NO_3)_3\cdot 4H_2O$) and a suitable amount of ethyl alcohol.

The impregnant may have its concentration of from 5 to 50% dependent upon the final magnitude of resistance to be obtained and the impregnation time may range from 5 to 24 hours dependent upon both the concentration of the impregnant and the dimension of the base body.

The impregnated base body is then dried for a period of time determined by the concentration of the impregnant and the dimension of the base body. With the impregnant having its concentration of 10%, the impregnation time exceeded 5 hours and the drying time was 12 hours during which the impregnated base body was heated from room temperature of about 150° C. at substantially uniform rate. When the impregnant had its concentration of 50%, the impregnation time exceeded 16 hours and the impregnated base body was dried for 24 hours during which the same was heated from room temperature to about 150° C. at a substantially uniform rate.

The base body thus treated is then fired in a vacuum furnace or a furnace having an atmosphere of an inert gas or a reducing gas at a temperature at which the impregnant will be decomposed, for a suitable period of time to convert the impregnant deposited throughout the entire of the base body involving its surface into the corresponding, electrically conducting material whereby an electrical resistance element is formed. It will be understood that the impregnant comprising a high molecular organic material is converted into a carbon while the metal salt or salts converted into the corresponding metal or metals. Therefore, this firing may be referred to as "reduction firing." It is to be noted that the firing temperature should be less than a temperature at which the materials of the base body is sintered. With the impregnant as previously mentioned being used, the base body may be preferably fired at a temperature of from 1100° to 1150° C. for about 1.5 hours.

In order to form an electrical resistance element in which an electrically conducting material is very uniformly distributed, the impregnation and firing operations as above described can be repeated as desired. Also the impregnation and firing operations using a high molecular weight organic material and those using a metal salt or salts can be alternatively repeated to form an electrical resistance element comprising carbon and a metal or metals. One form of the resistance elements thus prepared is shown in FIG. 1*a*.

The resistance element shown in FIG. 1*a* is of circular rod comprising a rod-like base body 10 including a mass of graphite or a metallic powder 12 tapped in a recess at each end thereof and an electrically conducting material 14 distributed in substantially all voids in the same according to the teachings of the invention.

Figure 1B:
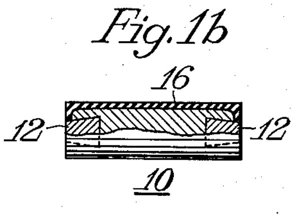

The resistance element is then heated in an oxidizing atmosphere such as air at a temperature of from 650° to 750° C. (±3° C.) for a relatively short time, for example, for 30 to 200 seconds while continuously rotated. This heating operation oxidizes the portion of carbon, or metal or metals precipitated on and adjacent the surface of the base body to thereby form an electrically insulating layer on the periphery of the same. If the precipitate is carbon the electrically insulating layer is composed of the material for the base body itself. Alternatively if the precipitate is of a metal type, the insulating layer includes the material for the base body and the corresponding metal oxide or oxides. Simultaneously, the oxidation of the conducting material distributed in the interior of the base body will gradually proceed from the surface toward the interior. Therefore, the resistance of the resistance element is progressively increased during heating. While the magnitude of the resistance of the element is continuously measured the heating operation as above described is continued to be performed until the element will have a predetermined magnitude of resistance. The resistance element thus heat-treated is shown in FIG. 1*b* in which the reference numeral 16 designates an electrically insulating surface layer formed as above described.

During heating operation, the portion of carbon precipitated on and adjacent the surface of the base body is burnt out leaving voids in the corresponding parts in the base body with the result that the voids are enclosed with the original material for the base body and the resulting electrically insulating layer includes the material for the body itself of metal or metals precipitated on and adjacent said surface is converted into the corresponding oxide or oxides remaining at the original positions. Since such oxide or oxides is or are substantially deprived of electrical conductivity the portion of metal or metals may be said to be removed from the base body by the heating operation, from the standpoint of electrical conduction.

The depth of the insulating layer formed depends upon the type of a composition resistor to be produced. Preferably, a composition resistor the reacting voltage of which is 500 volts includes an electrically insulating surface layer having a thickness of at least 0.3 mm. while a resistor having its rating voltage of 1000 volts includes such layer having a thickness of at least 0.5 mm. It is important to be noted that the surface firing operation as above described serves to form an electrically insulating surface layer on a surface of a resistance element and also to adjust a resistance of the element to a predetermined value.

After the completion of the heat treatment as above described, the resistance element is sintered in a vacuum furnace or a furnace having an atmosphere of an inert gas or a reducing gas, at a temperature above the heat-treating temperature, for example, 1270° to 1350° C. for a period of time sufficient to densificate the outer surface portion of the insulating layer 16 and then allowed to be cooled to about room temperature.

The sintering time depends upon the dimension of composition resistor to be produced. For example, the sintering time may be less than 2 hours for a two watt composition resistor. It has been found that the sintering operation causes the porosity of the insulating surface layer to be less than 0.3% calculated on the basis of the water-absorbing capacity of the same measured.

Figure 1C:
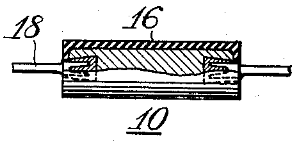

Then the mass of graphite or the metallic powder 12 tapped in the recess at each end of the resistance element is impregnated with any suitable heat-resisting resin such as an epoxy resin or a silicone resin and dried. The resin is partially cured. In this connection it is to be noted that the mass of graphite or the metallic powder is still maintained in porous state even after the same has been subjected to heat-treating and sintering operation as previously described. A suitable lead can pressed into the mixture of graphite and the partially cured resin at each end of the resistance element and the impregnated resin can be completely cured by heating to thereby rigidly secure the lead in the cured mass 16 against rotation and longitudinal movement. Thus a solid composition resistor is produced including a base body 10, an electrical resistance material 14 distributed within the same and having a predetermined value of resistance, an electrically insulating surface layer 16 composed of a material same as that of the base body and a terminal lead 18 rigidly secured to the body at each end as shown in FIG. 1*c*. It is to be noted the composition resistor thus produced is of monolithic structure.

The solid composition resistor may include a coating of heat-resisting paint applied to its surface and any suitable symbols such as bands of the R.M.A. color code on the coating for identifying its magnitude of resistance and characteristics.

Figure 2:
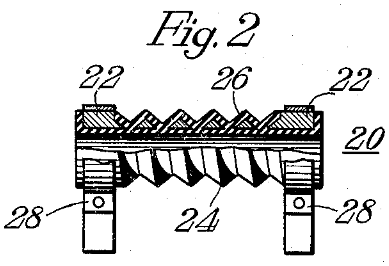
FIG. 2 shows an elevational view, in partial section of a solid composition resistor having its surface provided with a screw threaded protrusion and produced in accordance with the teachings of the invention.

The process of the invention thus far described is equally applicable to the production of solid composition resistors having any desired physical form other than the form of circular rod. As an example, FIG. 2 shows an embodiment of the invention of the circular rod including its outer surface provided with a screw threaded protrusion. According to the invention a resistance element shown in FIG. 2 can be prepared by first injection molding any powdered raw material for a base body 20 as previously described into the form of circular rod including a circularly cylindrical surface at each end portion 22 and a screw threaded protrusion 24 on the periphery along the substantial length thereof, partially sintering the molded body and impregnating any of the indicated impregnants throughout the entire of the base body, in the manner substantially same as that hereinbefore described in detail. In this case, it is noted that instead of the recess 12 (FIG. 1) the cylindrical end portion 22 is provided at each end and includes on the surface a graphite coating applied thereto prior to the impregnation operation for the purpose of preventing oxidation of the impregnant on said surface.

Then, with the cylindrical end portions of the base body clad with strips of a metal (not shown) such as nickel or a stainless steel, the impregnated, dried base body is fired in the manner as previously described until the portions of the impregnant distributed on and adjacent the surface of the screw threaded protrusion and from the surface of each trough of the screw threaded protrusion to the corresponding central zone are oxidized while an electrically conducting material converted from the impregnant is left only in each thread portion of the screw threaded protrusion and surrounded by an insulation 26 composed of the same material as the base body resulting from the removal of the impregnant. Also it is noted that the firing operation should be continued to be effected until a predetermined value of resistance will be obained as in the previous example.

Then the element thus threated is sintered to densificate the insulation as in the previous case.

The fabrication of the resistor is completed by removing the graphite coating from each of the cylindrical end portions and rigidly affixing suitable terminal means 28 such as a terminal lug or cap thereto.

Figure 3:
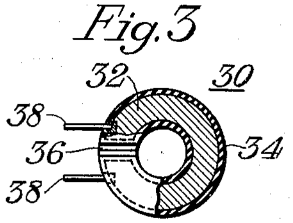
FIG. 3 shows a plan view of a solid composition resistor of circularly annular disk type produced in accordance with the teachings of the invention.
Figure 4:
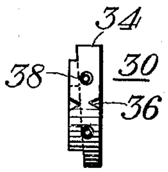
FIG. 4 shows a side elevational view of the resistor illustrated in FIG. 3.

Referring now to FIGS. 3 and 4 of the drawings, there is illustrated an electrical resistance element 30 for use in variable resistor prepared in accordance with the invention and comprising a base body of circularly annular disk 30, a major segment section of an electrically resistive material including one face 32 on which an electrically conducting material is bared and the other face and both edge portions 34 formed of an electrically insulating material, a radially reduced zone 36 sandwiched between both ends of the section and formed of said insulating material, and a pair of lead-in conductors 38 having the respective end portions embedded in the end portions of the section.

Such a resistance element can be produced as in the previous examples. More specially, a powdered raw material comprising, for example, the composition (1) as previously described is compression shaped in the form of circularly annular disk having a radially reduced zone 36 and partially sintered the shaped annular disk to form a base body 30. It will be understood that the base body should be provided adjacent the radially reduced zone with a pair of recesses for later receiving lead-in conductors respectively.

The base body is then impregnated throughout the entire thereof with any suitable impregnant as in the cases previously described. After having been dried, the base body is applied to one face thereof with a graphite coating for the purpose as previously described. A pair of the base bodies thus treated are fastened to each other by any suitable clamping means with the coated faces contacting each other. Then the pair of the impregnated base bodies are fired as in the previous examples to form an electrical insulation on the entire of the radially reduced portions and on all the sides of bodies excluding the side coated with graphite whereby a C-shaped electrically conducting passage is formed.

As previously described in detail in conjunction with the production of rod-like resistance element, the fired body is subsequently sintered to densificate the material of the insulation and the graphite coating is removed to expose an electrically conducting surface which, in turn is polished for the purpose as will be apparent hereinafter.

The fabrication of the resistance element is completed by rigidly affixing a pair of lead-in conductors 38 to the same in the recesses adjacent the radially reduced insulating zone.

By operatively coupling a sliding arm with the resistance element thus prepared in such a way that the sliding arm is arranged to slide circumferentially on the polished surface of the element, a variable solid composition resistor will be obtained.

The resistance element shown in FIGS. 3 and 4 is advantageous in that its resistance can be varied not only linearly but also non-linearly in the circumferential direction as by changing the thickness of the base body.

Figure 5:
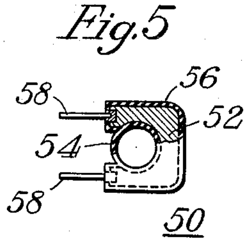
FIG. 5 shows a plan view of a relatively flat solid composition resistor of substantially U-shaped cross section produced in accordance with the teachings of the invention.
Figure 6:
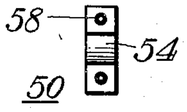
FIG. 6 shows a side elevational view of the resistor illustrated in FIG. 5.

Referring now to FIGS. 5 and 6, there is illustrated an electrical resistance element produced in accordance with the teachings of the invention for using in fabricating a variable solid composition resistor. It will be readily appreciated that the resistance element shown in FIGS. 5 and 6 can be prepared in the substantially same manner as does the element shown in FIGS. 3 and 4 excepting that the former element is initially compression shaped in the form of plate of substantially U-shaped cross section including a pair of leg portions the free ends of which are connected to each other through a thin portion 54 of a base body. As shown in FIGS. 5 and 6, the reresistance element comprises a base body 50, an electrically conducting passage 52 of substantially U-shaped cross section disposed within the body, an insulating thin portion 54 of the body for connecting a pair of leg portions of the passage, and a pair of lead-in conductors 58 rigidly affixed to said leg portions respectively. The conducting passage 52 has one face which is smoothly polished and on which a sliding arm is adaped to slide circumferentially. The remaining sides of the passage is surrounded by an electrically insulating surface layer 56 integral with the same and the base body.

The resistance elements shown in FIGS. 3 through 6 have their lead-in conductors extending from one side thereof alone so that its disposition in and its connection to a utilized circuitry can be simplified.

If the resistance element shown in FIGS. 3 and 4 or in FIGS. 5 and 6 will be similarly provided on said one face with an electrically insulating surface layer such as 34 or 56, the same will provide a durable solid composition resistor of flat plate type having an excellent moisture-resisting property.

The present invention has several advantages. For example, solid composition resistors can be very simply produced in various physical forms having even complicated configurations because of the use of compression shaping or injection molding. Any solid composition resistor of the invention is not required to include a separate protective surface layer which otherwise might be necessarily applied to the surface thereof after its resistance element has been finished, but includes a protective surface layer formed of the same insulating material as its base body and integral with both an electrically conducting material and the base body. This ensures that the insulating surface layer is mechanically, thermally and chemically strong and that the resistor is not substantially affected by moisture and chemicals. Therefore, there is no fear that the resistor will be varied in magnitude of resistance for long time. Further the resistor has its magnitude of resistance capable of being adjusted in accordance with oxidation firing time and a number of oxidation firing operations. In addition, a power rating of solid composition resistor according to the invention can range from a quarter to 500 watts. Thus the invention can provide solid composition resistors especially suitable for a variety of use.

While the invention has been described in conjunction with several preferred embodiments thereof it is to be understood that various changes and modifications may be made without departing from the spirit and scope of the invention.

What I claim is:

1. A process for producing a solid composite resistor comprising the steps of forming a mass of at least one finely divided refractory material selected from the group consisting of feldspars, porcelain clays, alumina, silicic acid anhydride, magnesia, zirconium dioxide and oxides of alkaline earth metals into a predetermined physical configuration, partially sintering the formed member to form an electrically insulating porous base body for the resistor, impregnating substantially the entire of the porous base body with an impregnant comprising at least one material selected alternatively from the groups of materials consisting of high molecular weight organic resins and nitrates of copper, nickel, molybdenum and titanium, drying the impregnated body, firing the dried body in an atmosphere to form by reduction from said impregnant an electrically conductive material substantially throughout the entire of the fired body, and surface firing the reduction fired body in an oxidizing atmosphere at a temperature of from about 500° to about 700° C. for a period of time sufficient to oxidize only a predetermined amount of that portion of the conductive material on and adjacent the exposed surface of the body thereby to adjust the resistance of that portion of the conducting material left in the body while forming on the exposed surface portion of the body an electrically insulating layer of a predetermined thickness consisting essentially of the components of the base body, whereby the base body includes therein a resistance path composed of the remaining of the conductive material and said path having the predetermined adjusted value of resistance determined by controlling the oxidation firing step and the insulating layer disposed enclosing the resistance path.

2. A process for producing a solid composite resistor comprising the steps of forming a mass of at least one finely divided refractory material selected from the group consisting of feldspars, porcelain clays, alumina, silicic acid anhydride, magnesia, zirconium dioxide and oxides of alkaline earth metals into a predetermined physical configuration with one end portion including a connection to a lead, partially sintering the formed member to form an electrically insulating porous base body for the resistor, impregnating substantially the entire of the porous base body with an impregnant comprising at least one material selected alternatively from the groups of materials consisting of high molecular weight organic resins and nitrates of copper, nickel, molybdenum and titanium, drying the impregnated body, firing the dried body in an atmosphere to cause formation the corresponding electrically conductive material of the impregnant substantially throughout the entire of the fired body, and surface firing the fired body in an oxidizing atmosphere at a temperature of from about 500° to about 700° C. for a period of time sufficient to oxidize only a predetermined amount of that portion of the conductive material on an adjacent the exposed surface of the body except for connection of leads thereby to adjust the resistance of that portion of the conductive material left in the body while forming on the exposed surface portion of the body an electrically insulating layer of a predetermined thickness consisting essentially of the components of the base body, whereby the base body includes therein a resistance path composed of the remaining of the conductive material, said path having the predetermined adjusted value of resistance and connected to the leads, and the insulating layer enclosing the resistance path.

3. A process for producing a solid composite resistor comprising the steps of forming a mass of at least one finely divided refractory material selected from the group consisting of feldspars, porcelain clays, alumina, silicic acid anhydride, magnesia, zirconium dioxide and oxides of alkaline earth metals into a predetermined physical configuration, partially sintering the formed member to form an electrically insulating porous base body for the resistor, impregnating substantially the entire of the porous base body with an impregnant comprising at least one material selected alternatively from the groups of materials consisting of high molecular weight organic resins and nitrates of copper, nickel, molybdenum and titanium, drying the impregnated body, firing the dried body in an atmosphere to cause reduction and formation of the corresponding electrically conductive material of the impregnant substantially throughout the entire of the fired body, surface firing the reduction fired body in an oxidizing atmosphere at a temperature of from about 500° to about 700° C. for a period of time sufficient to oxidize only a predetermined amount of that portion of the conductive material on and adjacent the exposed surface of the body thereby to adjust the resistance of that portion of the conductive material left in the body while forming on the exposed surface portion of the body an electrically insulating layer of a predetermined thickness consisting essentially of the components of the base body, and heating the oxidization fired body to a temperature of from about 100° to about 1400° C. in a nonoxidizing atmosphere for a period of time sufficient to cause the outermost surface portion of the insulating surface layer of the body to assume a non-porous state.

4. A process for producing a solid composite resistor comprising the steps of forming a mass of at least one finely divided refractory material selected from the group consisting of feldspars, porcelain clays, alumina, silicic acid anhydride, magnesia, zirconium dioxide and oxides of alkaline earth metals onto a predetermined physical configuration with a thin area of a predetermined shape formed on a predetermined portion of the mass, partially sintering the formed member to form an electrically insulating porous base body for the resistor, impregnating substantially the entire of the porous base body with an impregnant comprising at least one material selected alternatively from the groups of materials consisting of high molecular weight organic resins and nitrates of copper, nickel, molybdenum and titanium, drying the impregnated body, firing the dried body in an atmosphere to reduction precipitate the corresponding electrically conductive material of the impregnant substantially throughout the entire of the fired body, and surface firing the body in an oxidizing atmosphere at a temperature of from about 500° to about 700° C. for a period of time sufficient to oxidize only those portions of the conductive material on an adjacent the exposed surface of the body and disposed in the thin area thereby to adjust the resistance of that portion of the conductive material left in the body while forming on the exposed surface portion of the body and the thin area portion electrically insulating layers of a predetermined thickness consisting essentially of the components of the base body, whereby the base body includes therein a resistance path composed of the remaining of the conductive material and having a predetermined shape, the insulating layer enclosing the resistance path.

5. A process for producing a solid composite, variable resistor comprising the steps of forming a mass of at least one finely divided refractory material selected from the group consisting of feldspars, porcelain clays, alumina, silicic acid anhydride, magnesia, zirconium dioxide and oxides of alkaline earth metals into a predetermined physical configuration with the thickness varied in the direction to change the resistance of the finished resistor, partially sintering the formed member to form an electrically insulating porous base body for the resistor, impregnating substantially the entire of the porous base body with an impregnant comprising at least one material selected alternatively from the groups of materials consisting of high molecular weight organic resins and nitrates of copper, nickel, molybdenum and titanium drying the impregnated body, firing the dried body in an atmosphere to cause formation of the corresponding electrically conductive material of the impregnant substantially throughout the entire of the fired body, and surface firing the reduction fired body in an oxidizing atmosphere at a temperature of from about 500° to about 700° C. for a period of time sufficient to oxidize only a predetermined amount of that portion of the precipitated conductive material on and adjacent the exposed surface of the body except on a surface portion of the body providing a slide surface of the finished resistor on which a movable arm can slide, thereby to form an electrically insulating layer consisting essentially of the components of the base body on the exposed surface of the finished body except for the slide surface, whereby the base body includes the surface, the conductive slide surface composed of the conductive material connected to that portion of the conductive material remaining in the interior of the body.

References Cited by the Examiner

UNITED STATES PATENTS

| | | | |
|---|---|---|---|
| 1,847,653 | 3/32 | Jones et al. | 29—155.7 |
| 1,859,112 | 5/32 | Silberstein | 29—155.7 |
| 1,978,323 | 10/34 | Power | 29—155.7 |
| 2,281,843 | 5/42 | Jira | 29—155.7 |
| 2,361,435 | 10/44 | Swartz et al. | 117—112 |
| 2,440,691 | 5/48 | Jira | 29—155.7 |
| 2,935,717 | 5/60 | Solow | 338—308 |
| 2,994,846 | 8/61 | Quinn | 338—308 |
| 3,011,919 | 12/61 | Niklas | 117—112 |

WHITMORE A. WILTZ, *Primary Examiner.*

RAY K. WINDHAM, JOHN F. CAMPBELL, *Examiners.*